(12) United States Patent
Chung

(10) Patent No.: US 9,107,393 B2
(45) Date of Patent: Aug. 18, 2015

(54) STRUCTURE OF A HANDLE FOR A RETRACTABLE LEASH

(71) Applicant: Wing Yin Chung, Kwun Tong (HK)

(72) Inventor: Wing Yin Chung, Kwun Tong (HK)

( * ) Notice: Subject to any disclaimer, the term of this patent is extended or adjusted under 35 U.S.C. 154(b) by 8 days.

(21) Appl. No.: 13/848,709

(22) Filed: Mar. 21, 2013

(65) Prior Publication Data

US 2014/0216361 A1 Aug. 7, 2014

(30) Foreign Application Priority Data

Feb. 6, 2013 (CN) ...................... 2013 2 0072516 U

(51) Int. Cl.
*A01K 27/00* (2006.01)

(52) U.S. Cl.
CPC .................. *A01K 27/004* (2013.01)

(58) Field of Classification Search
CPC .................. A01K 27/003; A01K 27/004
USPC .................. 119/794, 796, 795, 797, 798; 242/405.2; 16/421, 422, 430, 431, 16/444–446

See application file for complete search history.

(56) References Cited

U.S. PATENT DOCUMENTS

| | | | | |
|---|---|---|---|---|
| 4,501,230 A * | 2/1985 | Talo | ............................ | 119/796 |
| 6,886,499 B2 * | 5/2005 | Meissner | ...................... | 119/796 |
| 7,131,401 B2 * | 11/2006 | Huff et al. | ...................... | 119/796 |
| 8,061,305 B2 * | 11/2011 | Sugalski | ...................... | 119/795 |
| 8,220,360 B2 * | 7/2012 | Li | ............................ | 74/551.9 |
| 8,561,338 B2 * | 10/2013 | Chvala | ............................ | 42/74 |
| 8,695,537 B2 * | 4/2014 | Bizzell et al. | ................. | 119/796 |
| 2006/0162675 A1 * | 7/2006 | Ghalebi et al. | ................. | 119/796 |
| 2007/0245514 A1 * | 10/2007 | Luebbering et al. | ............ | 15/410 |
| 2013/0247319 A1 * | 9/2013 | Rechtin et al. | ............... | 15/143.1 |

* cited by examiner

*Primary Examiner* — Rob Swiatek
*Assistant Examiner* — Danielle Clerkley

(57) ABSTRACT

A structure of a handle for a retractable leash comprises a holding piece; the holding piece is formed integrally as one piece by soft gel; a housing of the retractable leash is an assembly of a left housing and a right housing; the holding piece is fitted between the left housing and the right housing.

2 Claims, 1 Drawing Sheet

STRUCTURE OF A HANDLE FOR A RETRACTABLE LEASH

BACKGROUND OF THE INVENTION

The present invention relates to an improved retractable leash and more specifically relates to a structure of a handle for a retractable leash wherein the handle has functional usage and is comfortable to use.

Modern people keep on bringing their quality of life to a higher standard as they keep on improving their standard of living. The pursuit of high quality products has begun even in the market of pet-keeping. In order to meet the market demand, various retractable leashes for walking pets are now available in the market. In general, a retractable leash currently available in the market contains a retractable leash belt being a functional feature of the retractable leash. The retractable leash belt may be extended or retracted when walking the pets.

In order to use the retractable leash more comfortably, the retractable leash is generally covered with a soft gel layer of less than 2 mm on two sides of a handle for the retractable leash. The purpose of providing the soft gel layer is to prevent user's hand injury in case the pet runs in a high speed. However, a running pet may generate strong pulling force, and the soft gel on the two sides of the handle is too thin, and the soft gel is also not reinforced even after years of use, and furthermore, the handle is formed by assembling the two sides thereof. Due to the foregoing factors, user's injury is not reduced. Moreover, the pet may run in different directions. If the pet runs randomly towards both left and right directions, pulling force exerted to the retractable leash may tear the left and right housings of the retractable leash apart from each other. Not only will the retractable leash be damaged, but the components inside the retractable leash will also fall out and may hurt the passers-by.

BRIEF SUMMARY OF THE INVENTION

In view of the disadvantages now existing in the prior art, the present invention provides an improved structure of a handle for a retractable leash.

The present invention is attained as follows:

A structure of a handle for a retractable leash comprises a holding piece; the holding piece is formed integrally as one piece by soft gel; a housing of the retractable leash is an assembly of a left housing and a right housing; the holding piece is fitted between the left housing and the right housing.

Mounting members are disposed around the holding piece and each of the mounting members has a left mounting slot and a right mounting slot; the left mounting slot and the right mounting slot of each of the mounting members are fitted with corresponding handle flanges of the left housing and the right housing respectively.

The holding piece bulges in an arc shape at a position where users hold the holding piece; the position where users hold the holding piece does not contain any connecting joints. A handle formed integrally as one piece provides a more comfortable and gentle feeling to users and significantly enhances hand protection.

The present invention has the following advantages:

The left housing and the right housing of the present invention are not connected by screws or set screws like those retractable leashes now available in the market. Instead, firmness of the handle is strengthened by connecting the left housing and right housing with the holding piece. Therefore, even if the pets run randomly towards both left and right directions and thus exert stronger pulling force on the retractable leash, it is not easy to tear the left housing and the right housing apart and the left housing and right housing will not be entirely fallen apart due to overwhelming force. As a result, the present invention can prevent essential components of the retractable leash from falling out, prevent total damage of the retractable leash and reduce the risk of injury happened to users and passers-by.

DETAILED DESCRIPTION OF THE INVENTION

The present invention is now further described below with reference to an embodiment and the accompanying drawings, but the present invention should not be limited to the embodiment described below.

Figure 1:
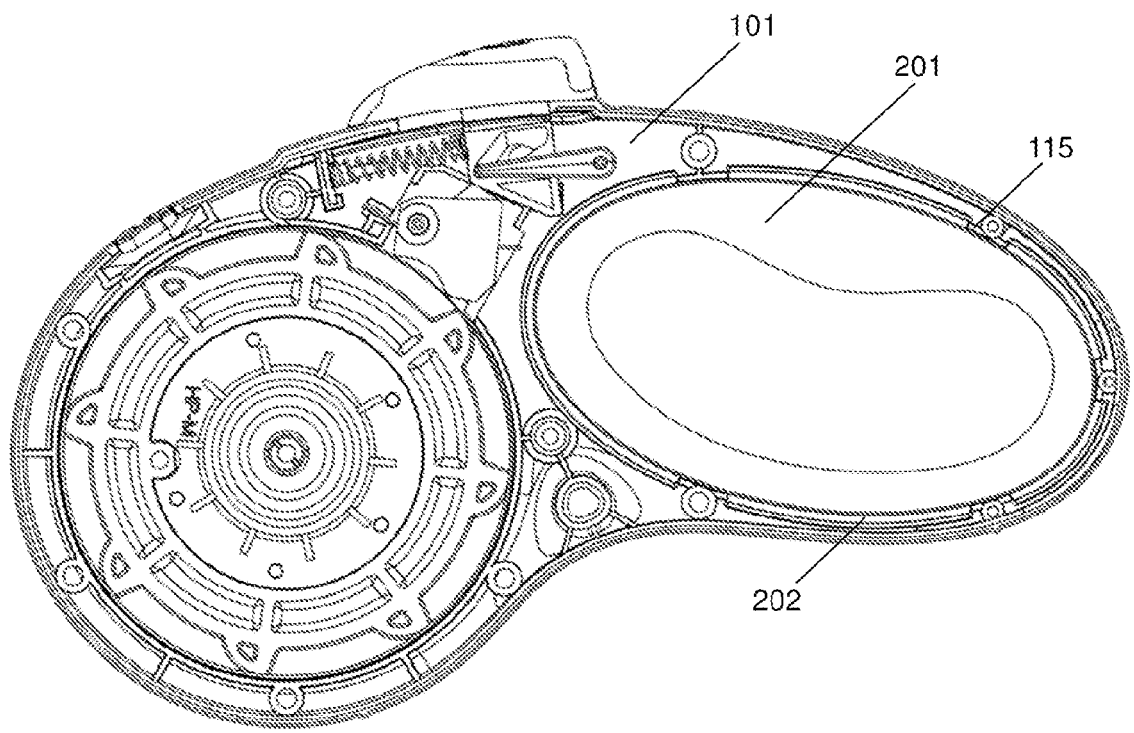
FIG. 1 is a sectional view illustrating a handle for a retractable leash according to the present invention when the retractable leash is not in use.
Figure 2:
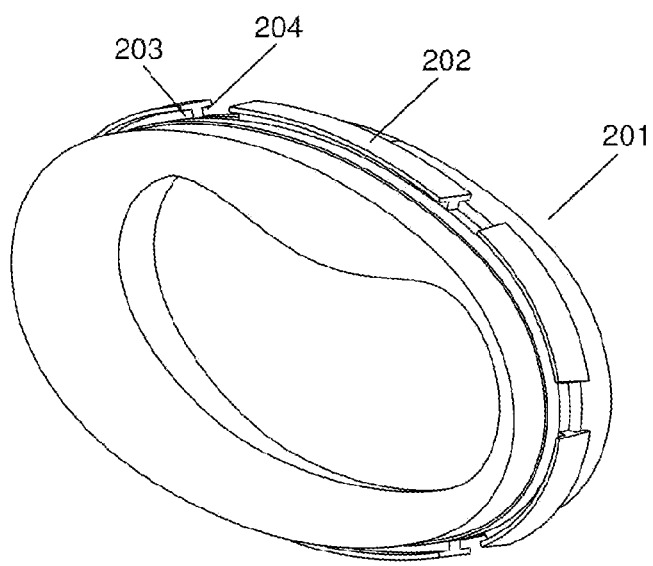
FIG. 2 is a holding piece of the handle for a retractable leash according to the present invention.

A structure of a handle for a retractable leash comprises a holding piece 201; the holding piece 201 is formed integrally as one piece by soft gel; a housing 101 of the retractable leash housing is an assembly of a left housing and a right housing (the one shown in FIG. 1 is the right housing); the holding piece 201 is fitted between the left housing and the right housing.

Mounting members 202 are disposed around the holding piece 201 and each of the mounting members 202 has a left mounting slot 203 and a right mounting slot 204; the left mounting slot 203 and the right mounting slot 204 of each of the mounting members 202 are fitted with corresponding handle flanges 115 of the left housing and the right housing respectively.

The holding piece 201 bulges in an arc shape at a position where users hold the holding piece 201; the position where users hold the holding piece 201 does not contain any connecting joints. A handle formed integrally as one piece provides a more comfortable and gentle feeling to users and significantly enhances hand protection.

The above embodiment is only a preferred description of the present invention. The present invention should not be limited to the above embodiment. Any substantive or fundamental changes, modifications, replacement, combination and simplification of the present invention without deviating from the spirit of the present invention should be considered equivalent substitutions and should therefore fall within the scope of protection of the present invention.

What is claimed is:

1. A structure for a retractable leash comprises:
    a holding piece for a user to grip, the holding piece having an oblong shape and an axial opening having a substantially oblong-shaped transverse cross-section, the holding piece is formed integrally as one piece by soft gel;
    a housing for a retractable leash, the housing comprises an assembly of a left housing portion and a right housing portion, the left housing portion and the right housing portion each having an opening, each opening of the left housing portion and the right housing portion having a shape corresponding to a circumference of an outer contour of the holding piece, and handle flanges disposed about each opening of the left housing portion and the right housing portion;

the holding piece being fixedly fitted between the left housing portion and the right housing portion and within each opening of the left housing portion and the right housing portion, such that the outer contour of the holding piece is completely surrounded by the left housing portion and the right housing portion and the axial opening is exposed for the user to grip;

and mounting members being disposed about the outer contour of the holding piece, each of the mounting members having a T-shaped transverse cross-section with a left mounting slot and a right mounting slot, the left mounting slot and the right mounting slot of each of the mounting members being engaged with corresponding handle flanges of the left housing portion and the right housing portion respectively.

2. The structure for a retractable leash as in claim 1, wherein the holding piece bulges in an arc shape into the axial opening where the user holds the holding piece.

\* \* \* \* \*